United States Patent
Krebs et al.

(10) Patent No.: US 6,827,578 B2
(45) Date of Patent: Dec. 7, 2004

(54) NAVIGATING E-LEARNING COURSE MATERIALS

(75) Inventors: Andreas Krebs, Karlsruhe (DE); Wolfgang Gerteis, Karlsruhe (DE); Michael Altenhofen, Karlsruhe (DE)

(73) Assignee: SAP Aktiengesellschaft, Walldorf ( * ) Notice: Subject to any disclaimer, the term of this patent is extended or adjusted under 35 U.S.C. 154(b) by 137 days.

(21) Appl. No.: 10/134,681

(22) Filed: Apr. 30, 2002

(65) Prior Publication Data

US 2003/0152906 A1 Aug. 14, 2003

Related U.S. Application Data

(60) Provisional application No. 60/354,945, filed on Feb. 11, 2002.

(51) Int. Cl.[7] .............................................. G09B 19/00
(52) U.S. Cl. ........................ 434/118; 434/362; 434/350
(58) Field of Search ................................ 434/118, 362, 434/350

(56) References Cited

U.S. PATENT DOCUMENTS

| | | |
|---|---|---|
| 6,011,949 A | 1/2000 | Shimomukai |
| 6,112,049 A | 8/2000 | Sonnenfeld |
| 6,149,441 A | 11/2000 | Pellegrino et al. |
| 6,162,060 A | 12/2000 | Richard et al. |
| 6,315,572 B1 | 11/2001 | Owens et al. |
| 6,368,110 B1 | 4/2002 | Koenecke et al. |
| 6,398,556 B1 | 6/2002 | Ho et al. |
| 6,514,085 B2 | 2/2003 | Slattery et al. |
| 6,606,480 B1 | 8/2003 | L'Allier et al. |
| 6,633,742 B1 | 10/2003 | Turner et al. |
| 2001/0044728 A1 | 11/2001 | Freeman et al. |
| 2001/0047310 A1 | 11/2001 | Russell |
| 2003/0013073 A1 | 1/2003 | Duncan et al. |
| 2003/0082508 A1 | 5/2003 | Barney |
| 2003/0113700 A1 | 6/2003 | Simon |
| 2003/0152899 A1 * | 8/2003 | Krebs et al. ................. 434/350 |
| 2003/0152900 A1 * | 8/2003 | Krebs et al. ................. 434/350 |
| 2003/0152903 A1 * | 8/2003 | Theilmann ................... 434/350 |
| 2003/0152904 A1 | 8/2003 | Doty, Jr. |
| 2003/0152905 A1 * | 8/2003 | Altenhofen et al. ......... 434/362 |
| 2003/0175664 A1 | 9/2003 | Frangenheim et al. |
| 2003/0175676 A1 * | 9/2003 | Theilmann et al. .......... 434/350 |

OTHER PUBLICATIONS

Jörg Siekmann et al., "Adaptive Course Generation and Presentation," ITS Workshop on Adaptive and Intelligent Web–Based Foundation System, Montreal, The Omega Group; pp. 1–10, 2000.

Lai Jin et al., "An Ontology–Aware Authoring Tool— Functional structure and guidance generation," Proceedings of AIED '99, pp. 85–92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Education Systems", pp. 1–4, 1999.

(List continued on next page.)

*Primary Examiner*—Chanda L. Harris
(74) *Attorney, Agent, or Firm*—Fish & Richardson P.C.

(57) ABSTRACT

A learning system, method, and software generate a navigation path through a course based on a learning strategy. The course may be navigated by receiving graphs corresponding to the course, applying the learning strategy to the graphs, and generating a navigation path through the course for the learner based on the applied strategy. The navigation path may be used to suggest content from the course for presentation to a learner.

45 Claims, 8 Drawing Sheets

OTHER PUBLICATIONS

Michael Jungmann et al., "Adaptive Hypertext in Complex Information Spaces," Daimler–Benz Research & Technology, Technical University of Ilmenau, pp. 1–5, Mar. 8, 1997.

Nicola Henze et al., "Modeling Constructivist Teaching Functionality and Structure in the KBS Hyberbook System," University of Hannover, pp. 1–12, Jun. 4, 1999.

Max Mühlhäuser, "Cooperative Computer–Aided Authoring and Learning," University of Karlsruhe, pp. 107–130, 145–161, 165–192, 273–291, 293–318, 1995.

Professor Jouko Paaso, "A New Environment for Courseware Development, Course Delivery and Training," Proceedings of the ED–Media 97, Toronto, 1997.

* cited by examiner

NAVIGATING E-LEARNING COURSE MATERIALS

This application claims priority from U.S. Provisional Application No. 60/354,945, filed Feb. 11, 2002, and titled FLEXIBLE INSTRUCTIONAL ARCHITECTURE FOR E-LEARNING, which is hereby incorporated by reference in its entirety for all purposes.

TECHNICAL FIELD

The following description relates generally to e-learning and in particular to methods and systems for flexible e-learning.

BACKGROUND

Systems and applications for delivering computer-based training (CBT) have existed for many years. However, CBT systems historically have not gained wide acceptance. A problem hindering the reception of CBTs as a means of training workers and learners is the compatibility between systems. A CBT system works as a stand-alone system that is unable to use content designed for use with other CBT systems.

Early CBTs also were based on hypermedia systems that statically linked content. User guidance was given by annotating the hyperlinks with descriptive information. The trainee could proceed through learning material by traversing the links embedded in the material. The structure associated with the material was very rigid, and the material could not be easily written, edited, or reused to create additional or new learning material.

Newer methods for intelligent tutoring and CBT systems are based on special domain models that must be defined prior to creation of the course or content. Once a course is created, the material may not be easily adapted or changed for different learners' specific training needs or learning styles. As a result, the courses often fail to meet the needs of the trainee and/or trainer.

The special domain models also have many complex rules that must be understood prior to designing a course. As a result, a course is too difficult for most authors to create who have not undergone extensive training in the use of the system. Even authors who receive sufficient training may find the system difficult and frustrating to use. In addition, the resulting courses may be incomprehensible due to incorrect use of the domain model by the authors creating the course. Therefore, for the above and other reasons, new methods and technology are needed to supplement traditional computer based training and instruction.

SUMMARY

In one general aspect, a learning system, method, and software may be used to generate a navigation tree and a navigation path through a course based on a learning strategy. The course may be navigated by receiving graphs corresponding to the course, applying the learning strategy to the graphs, and generating a navigation path through the course for the learner based on the applied strategy. The navigation path may be used to suggest content from the course for presentation to a learner.

The learner may choose to navigate to content suggested by the navigation path. In addition, in one implementation, the learner may choose to navigate to material that is not suggested. The navigation path also may be used to hide content that a learner may not be ready to navigate to.

In another general aspect, the graphs include a number of nodes. Each node may correspond to a course, a sub-course, a learning unit, or a knowledge item. The nodes may include attributes that correspond to metadata. The metadata may include knowledge types. Metadata also may be used to store competencies. In addition, there may be a relation between the nodes of a graph.

In yet another general aspect, applying the learning strategy includes applying a set of Boolean predicates to the one or more graphs. In addition, functions may be applied to the nodes to generate sets. The navigation path may be generated by applying an ordering function to the sets to generate an ordered list. The navigation path may be based on the ordered list. A set of navigation nodes may be determined based on the functions that indicate nodes identified by the learning strategy to be presented to the learner. A set of one or more start nodes may be determined from the functions that indicate a node within a graph that may be visited by the learner before other nodes.

Other features and advantages will be apparent from the description, the drawings, and the claims.

DESCRIPTION OF DRAWINGS

Like reference symbols in the various drawings indicate like elements.

DETAILED DESCRIPTION

E-learning Content Structure

The e-learning system and methodology structures content so that the content is reusable and flexible. For example, the content structure allows the creator of a course to reuse existing content to create new or additional courses. In addition, the content structure provides flexible content delivery that may be adapted to the learning styles of different learners.

Figure 1:
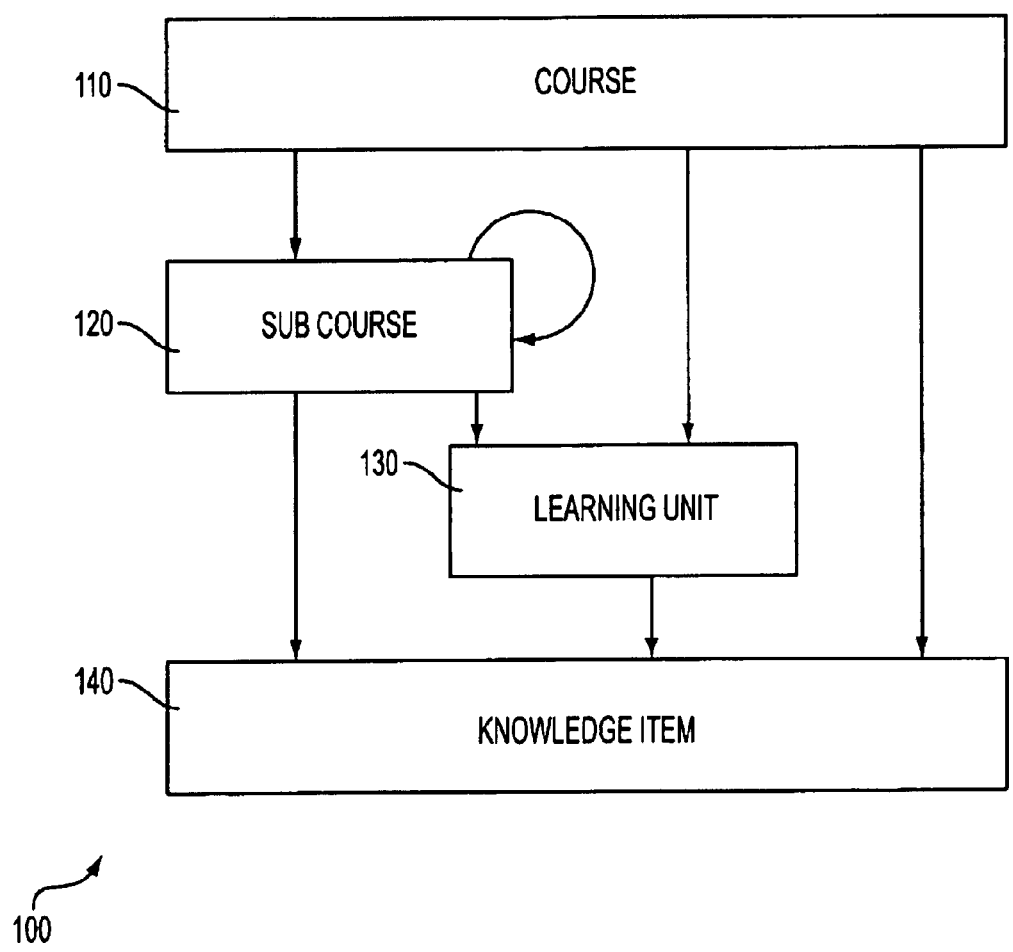
FIG. 1 is an exemplary content aggregation model.

E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 1, course material 100 may be divided into four structural elements: a course 110, a sub-course 120, a learning unit 130, and a knowledge item 140.

Starting from the lowest level, knowledge items 140 are the basis for the other structural elements and are the building blocks of the course content structure. Each knowledge item 140 may include content that illustrates, explains, practices, or tests an aspect of a thematic area or topic. Knowledge items 140 typically are small in size (i.e., of short duration, e.g., approximately five minutes or less).

A number of attributes may be used to describe a knowledge item 140, such as, for example, a name, a type of media, and a type of knowledge. The name may be used by a learning system to identify and locate the content associated with a knowledge item 140. The type of media describes the form of the content that is associated with the knowledge item 140. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

A knowledge item 140 also may be described by the attribute of knowledge type. For example, knowledge types include knowledge of orientation, knowledge of action, knowledge of explanation, and knowledge of source/ reference. Knowledge types may differ in learning goal and content. For example, knowledge of orientation offers a point of reference to the learner, and, therefore, provides general information for a better understanding of the structure of interrelated structural elements. Each of the knowledge types are described in further detail below.

Knowledge items 140 may be generated using a wide range of technologies, however, a browser (including plug-in applications) should be able to interpret and display the appropriate file formats associated with each knowledge item. For example, markup languages (such as a Hypertext Markup language (HTML), a standard generalized markup language (SGML), a dynamic HTML (DHTML®), or an extensible markup language (XML)), JAVASCRIPT® (a client-side scripting language), and/or FLASH® may be used to create knowledge items 140.

HTML may be used to describe the logical elements and presentation of a document, such as, for example, text, headings, paragraphs, lists, tables, or image references.

FLASH® may be used as a file format for FLASH® movies and as a plug-in for playing FLASH® files in a browser. For example, FLAS® movies using vector and bitmap graphics, animations, transparencies, transitions, MP3 audio files, input forms, and interactions may be used. In addition, FLASH® allows a pixel-precise positioning of graphical elements to generate impressive and interactive applications for presentation of course material to a learner.

Learning units 130 may be assembled using one or more knowledge items 140 to represent, for example, a distinct, thematically-coherent unit. Consequently, learning units 130 may be considered containers for knowledge items 140 of the same topic. Learning units 130 also may be considered relatively small in size (i.e., duration) though larger than a knowledge item 140.

Sub-courses 120 may be assembled using other sub-courses 120, learning units 130, and/or knowledge items 140. The sub-course 120 may be used to split up an extensive course into several smaller subordinate courses. Sub-courses 120 may be used to build an arbitrarily deep nested structure by referring to other sub-courses 120.

Courses may be assembled from all of the subordinate structural elements including sub-courses 120, learning units 130, and knowledge items 140. To foster maximum reuse, all structural elements should be self-contained and context free.

Structural elements also may be tagged with metadata that is used to support adaptive delivery, reusability, and search/ retrieval of content associated with the structural elements. For example, learning object metadata (LOM) defined by the IEEE "Learning Object Metadata Working Group" may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 2:
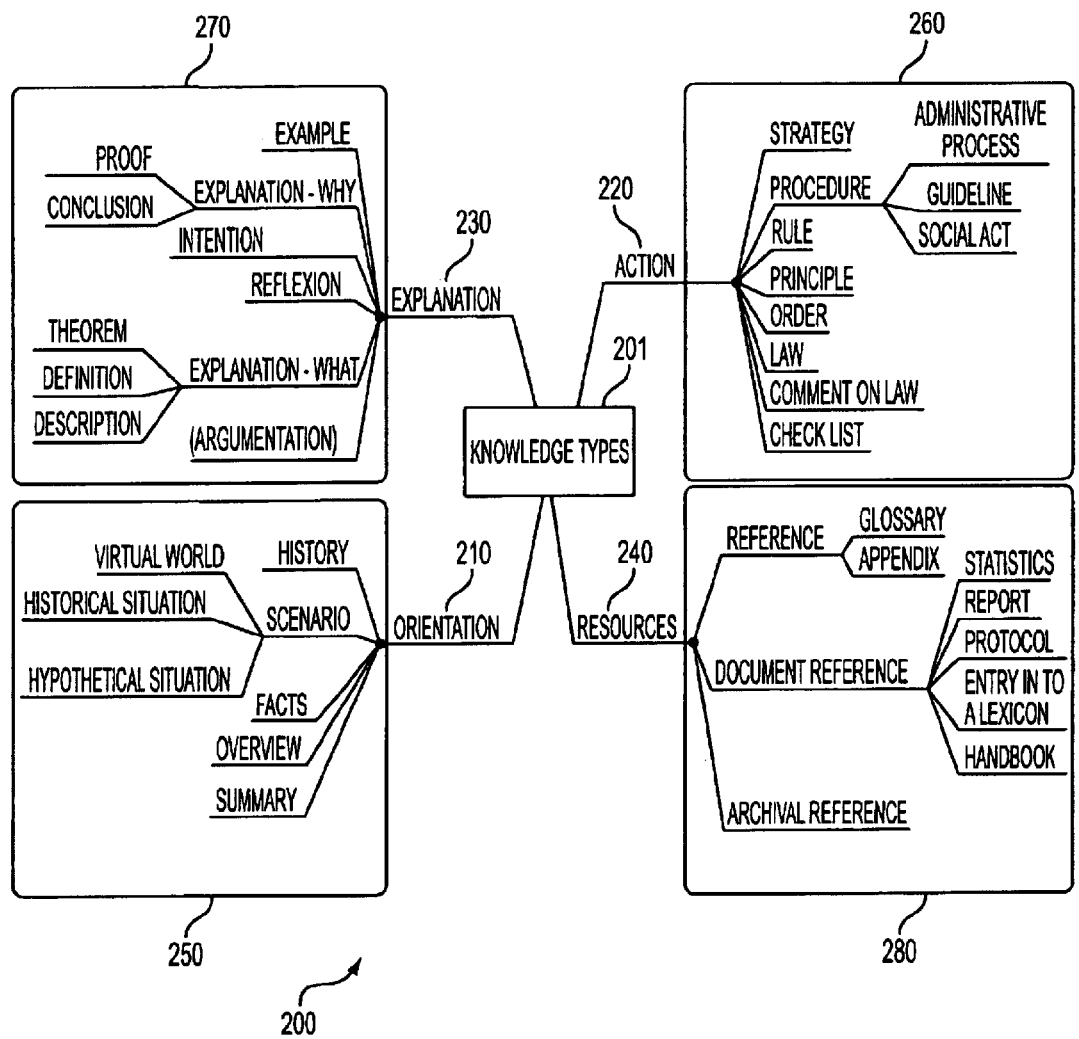
FIG. 2 is an example of an ontology of knowledge types.

As shown in FIG. 2, structural elements may be categorized using a didactical ontology 200 of knowledge types 201 that includes orientation knowledge 210, action knowledge 220, explanation knowledge 230, and reference knowledge 240. Orientation knowledge 210 helps a learner to find their way through a topic without being able to act in a topic-specific manner and may be referred to as "know what." Action knowledge 220 helps a learner to acquire topic related skills and may be referred to as "know how." Explanation knowledge 230 provides a learner with an explanation of why something is the way it is and may be referred to as "know why." Reference knowledge 240 teaches a learner where to find additional information on a specific topic and may be referred to as "know where."

The four knowledge types (orientation, action, explanation, and reference) may be further divided into a fine grained ontology as shown in FIG. 2. For example, orientation knowledge 210 may refer to sub-types 250 that include a history, a scenario, a fact, an overview, and a summary. Action knowledge 220 may refer to sub-types 260 that include a strategy, a procedure, a rule, a principle, an order, a law, a comment on law, and a checklist. Explanation knowledge 230 may refer to sub-types 270 that include an example, a intention, a reflection, an explanation of why or what, and an argumentation. Resource knowledge 240 may refer to sub-types 280 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/ whole relation "A has part B" describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A)

The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to,""alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B)). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 140 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 120 or a learning unit 130. The competencies may be used to indicate and evaluate the performance of a learner as the learner traverse the course material. A competency may be classified as a cognitive skill, an emotional skill, an senso-motorical skill, or a social skill.

Figure 3:
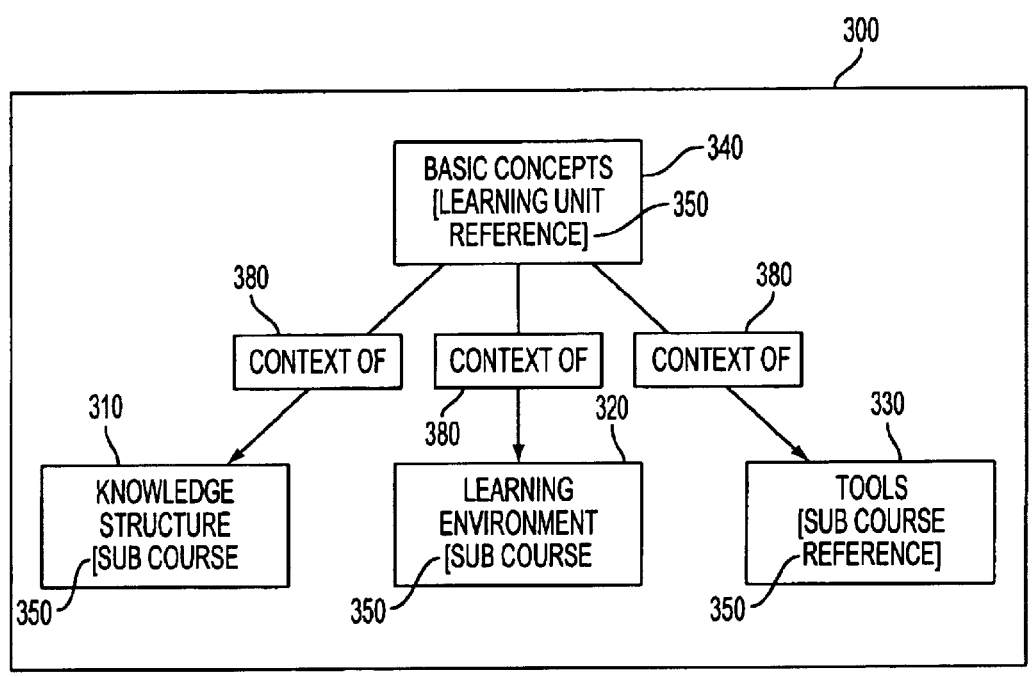
FIG. 3 is an example of a course graph for e-learning.

The content structure associated with a course may be represented as a set of graphs. A structural element may be represented as a node in a graph. Node attributes are used to convey the metadata attached to the corresponding structural element (e.g., a name, a knowledge type, a competency, and/or a media type). A relation between two structural elements may be represented as an edge. For example, FIG. 3 shows a graph 300 for a course. The course is divided into four structural elements or nodes (310, 320, 330, and 340): three sub-courses (e.g., knowledge structure, learning environment, and tools) and one learning unit (e.g., basic concepts). A node attribute 350 of each node is shown in brackets (e.g., the node labeled "Basic concepts" has an attribute that identifies it as a reference to a learning unit). In addition, an edge 380 expressing the relation "context of" has been specified for the learning unit with respect to each of the sub-courses. As a result, the basic concepts explained in the learning unit provide the context for the concepts covered in the three sub-courses.

Figure 4:
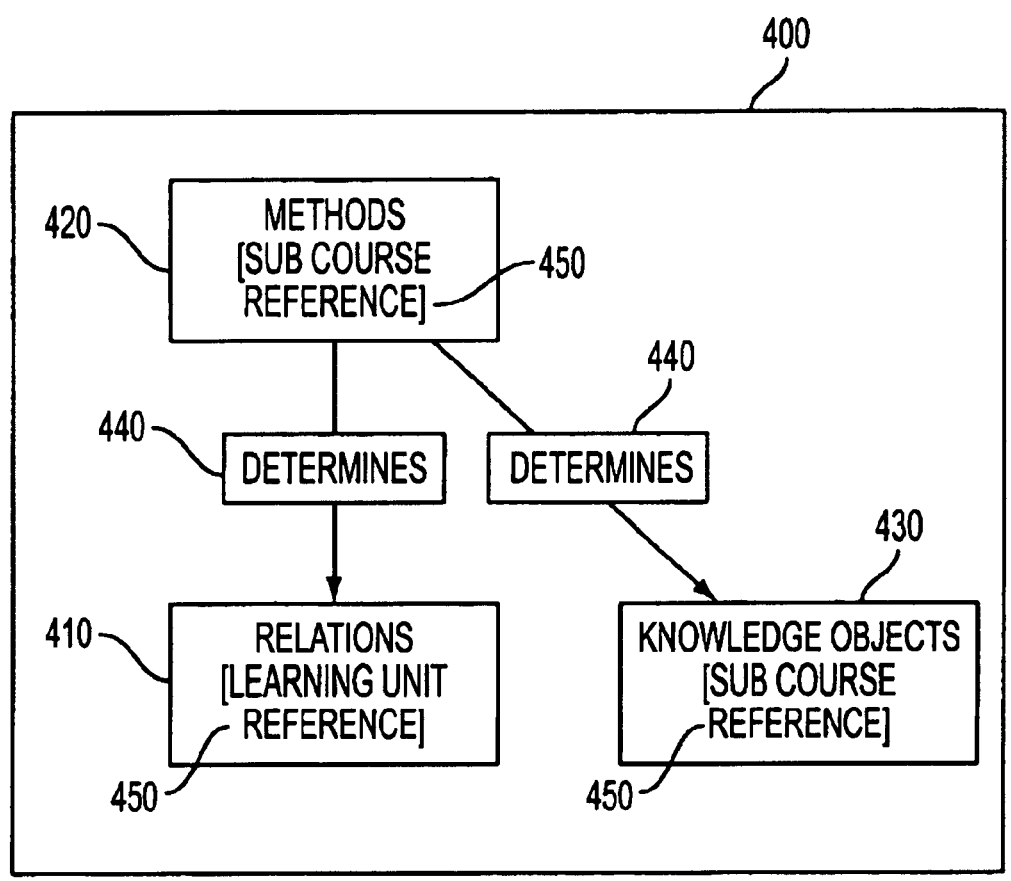
FIG. 4 is an example of a sub-course graph for e-learning.

FIG. 4 shows a graph 400 of the sub-course "Knowledge structure" 350 of FIG. 3. In this example, the sub-course "Knowledge structure" is further divided into three nodes (410, 420, and 430): a learning unit (e.g., on relations) and two sub-courses (e.g., covering the topics of methods and knowledge objects). The edge 440 expressing the relation "determines" has been provided between the structural elements (e.g., the sub-course "Methods" determines the sub-course "Knowledge objects" and the learning unit "Relations".) In addition, the attributes 450 of each node is shown in brackets (e.g., nodes "Methods" and "Knowledge objects" have the attribute identifying them as references to other sub-courses; node "Relations" has the attribute of being a reference to a learning unit).

Figure 5:
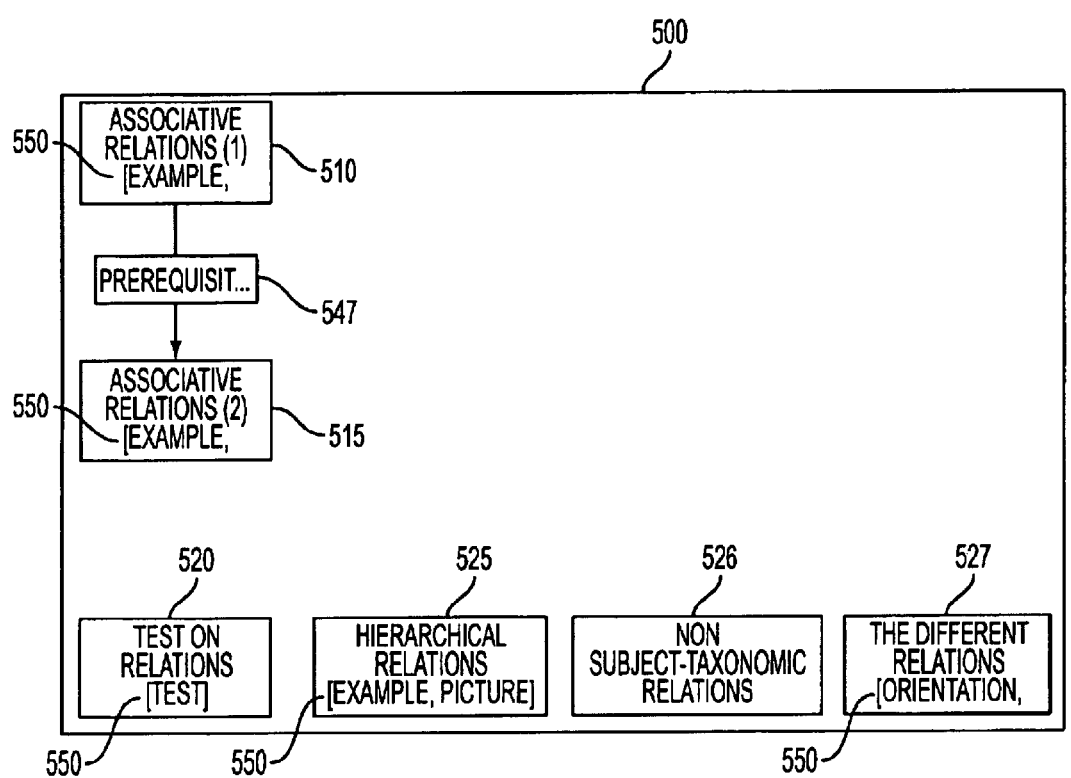
FIG. 5 is an example of a learning unit graph for e-learning.

FIG. 5 shows a graph 500 for the learning unit "Relations" 450 shown in FIG. 4. The learning unit includes six nodes (510, 515, 520, 525, 530, 535, 540, and 545): six knowledge items (i.e., "Associative relations (1)", "Associative relations (2)", "Test on relations", "Hierarchical relations", "Non subject-taxonomic relations", and "The different relations"). An edge 547 expressing the relation "prerequisite" has been provided between the knowledge items "Associative relations (1)" and "Associative relations (2)." In addition, attributes 550 of each node are specified in brackets (e.g., the node "Hierarchical relations" includes the attributes "Example" and "Picture").

E-learning Strategies

The above-described content aggregation and structure associated with a course does not automatically enforce any sequence that a learner may use to traverse the content associated with the course. As a result, different sequencing rules may be applied to the same course structure to provide different paths through the course. The sequencing rules applied to the knowledge structure of a course are learning strategies. The learning strategies may be used to pick specific structural elements to be suggested to the learner as the learner progresses through the course. The learner or supervisor (e.g., a tutor) may select from a number of different learning strategies while taking a course. In turn, the selected learning strategy considers both the requirements of the course structure and the preferences of the learner.

In the classical classroom, a teacher determines the learning strategy that is used to learn course material. For example, in this context the learning progression may start with a course orientation, followed by an explanation (with examples), an action, and practice. Using the e-learning system and methods, a learner may choose between one or more learning strategies to determine which path to take through the course. As a result, the progression of learners through the course may differ.

Learning strategies may be created using macro-strategies and micro-strategies. A learner may select from a number of different learning strategies when taking a course. The learning strategies are selected at run time of the presentation of course content to the learner (and not during the design of the knowledge structure of the course). As result, course authors are relieved from the burden of determining a sequence or an order of presentation of the course material. Instead, course authors may focus on structuring and annotating the course material. In addition, authors are not required to apply complex rules or Boolean expressions to domain models thus minimizing the training necessary to use the system. Furthermore, the course material may be easily adapted and reused to edit and create new courses.

Macro-strategies are used in learning strategies to refer to the coarse-grained structure of a course (i.e., the organization of sub-courses 120 and learning units 130). The macro-strategy determines the sequence that sub-courses 120 and learning units 130 of a course are presented to the learner. Basic macro-strategies include "inductive" and "deductive," which allow the learner to work through the course from the general to the specific or the specific to the general, respectively. Other examples of macro-strategies include "goal-based, top-down," "goal-based, bottom-up," and "table of contents."

Goal-based, top-down follows a deductive approach. The structural hierarchies are traversed from top to bottom. Relations within one structural element are ignored if the relation does not specify a hierarchical dependency. Goal-based bottom-up follows an inductive approach by doing a depth first traversal of the course material. The table of contents simply ignores all relations.

Micro-strategies, implemented by the learning strategies, target the learning progression within a learning unit. The micro-strategies determine the order that knowledge items of a learning unit are presented. Micro-strategies refer to the attributes describing the knowledge items. Examples of micro-strategies include "orientation only", "action oriented", "explanation-oriented", and "table of contents").

The micro-strategy "orientation only" ignores all knowledge items that are not classified as orientation knowledge. The "orientation only" strategy may be best suited to implement an overview of the course. The micro-strategy "action oriented" first picks knowledge items that are classified as action knowledge. All other knowledge items are sorted in their natural order (i.e., as they appear in the knowledge structure of the learning unit). The micro-strategy "explanation oriented" is similar to action oriented and focuses on explanation knowledge. Orientation oriented is similar to action oriented and focuses on orientation knowledge. The micro-strategy "table of contents" operates like the macro-strategy table of contents (but on a learning unit level).

In one implementation, no dependencies between macro-strategies and micro-strategies exist. Therefore, any combination of macro and micro-strategies may be used when taking a course. Application of learning strategies to the knowledge structure of a course is described in further detail below.

E-learning System

Figure 6:
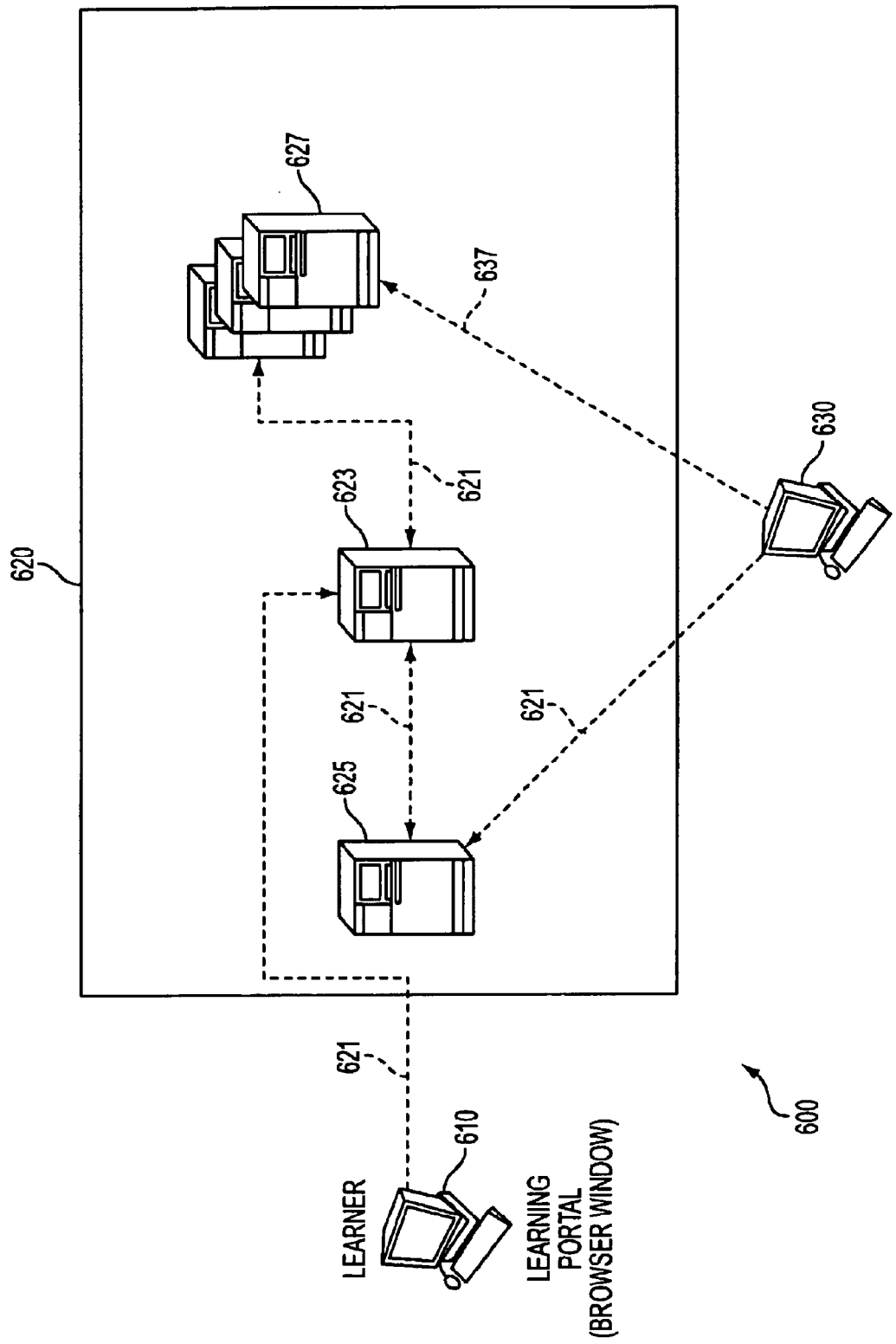
FIGS. 6 and 7 are exemplary block diagrams of e-learning systems.
Figure 7:
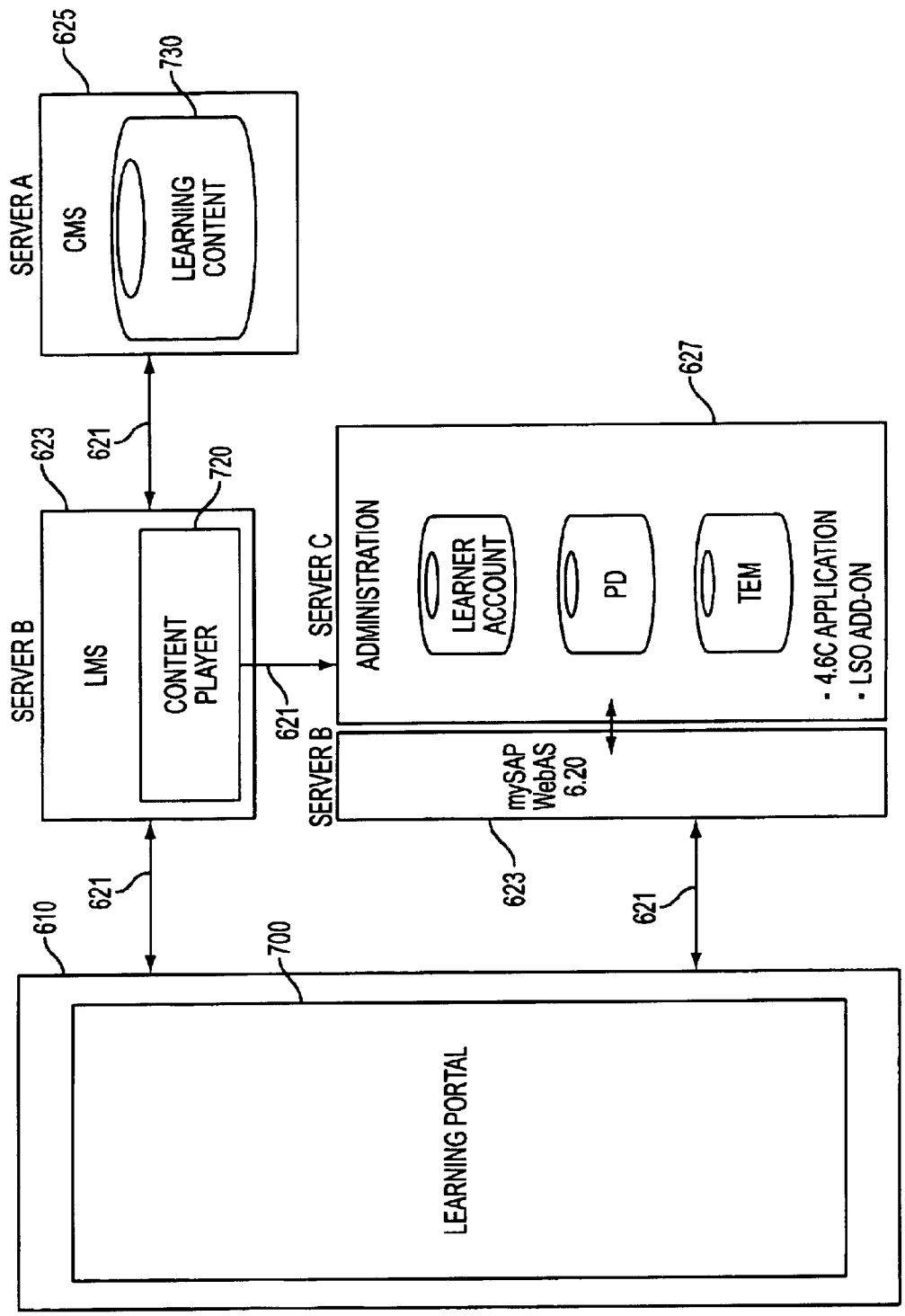

As shown in FIG. 6 an e-learning architecture 600 may include a learning station 610 and a learning system 620. The learner may access course material using a learning station 610 (e.g., using a learning portal). The learning station 610 may be implemented using a work station, a computer, a portable computing device, or any intelligent device capable of executing instructions and connecting to a network. The learning station 610 may include any number of devices and/or peripherals (e.g., displays, memory/storage devices, input devices, interfaces, printers, communication cards, and speakers) that facilitate access to and use of course material.

The learning station 610 may execute any number of software applications, including an application that is configured to access, interpret, and present courses and related information to a learner. The software may be implemented using a browser, such as, for example, NETSCAPE COMMUNICATOR®, MICROSOFT INTERNET EXPLORER®, or other software application that may be used to interpret and process a markup language, such as HTML, SGML, DHTML® or XML.

The browser also may include software plug-in applications that allow the browser to interpret, process, and present different types of information. The brows may include any number of application tools, such as, for example, JAVA®, ACTIVE X®, JAVASCRIPT®, and FLASH®.

The browser may be used to implement a learning portal that allows a learner to access the learning system 620. A link 621 between the learning portal and the learning system 620 may be configured to send and receive signals (e.g., electrical, electromagnetic, or optical). In addition, the link may be a wireless link that uses electromagnetic signals (e.g., radio, infrared, to microwave) to convey information between the learning station and the learning system.

The learning system may include one or more servers. As shown in FIG. 6, the learning system 620 includes a learning management system 623, a content management system 625, and an administration management system 627. Each of these systems may be implemented using one or more servers, processors, or intelligent network devices.

The administration system may be implemented using a server, such as, for example, the SAP R/3 4.6 C+LSO Add-On. The administration system may include a database of learner accounts and course information. For example, the learner account may include demographic data about the learner (e.g., a name, an age, a sex, an address, a company, a school, an account number, and a bill) and his/her progress through the course material (e.g., places visited, tests completed, skills gained, knowledge acquired, and competency using the material). The administration system also may provide additional information about courses, such as the courses offered, the author/instructor of a course, and the most popular courses.

The content management system may include a learning content server. The learning content server may be implemented using a WebDAV server. The learning content server may include a content repository. The content repository may store course files and media files that are used to present a course to a learner at the learning station. The course files may include the structural elements that make up a course and may be stored as XML files. The media files may be used to store the content that is included in the course and assembled for presentation to the learner at the learning station.

The learning management system may include a content player. The content player may be implemented using a server, such as, an SAP J2EE Engine. The content player is used to obtain course material from the content repository. The content player also applies the learning strategies to the obtained course material to generate a navigation tree for the learner. The navigation tree is used to suggest a route through the course material for the learner and to generate a presentation of course material to the learner based on the learning strategy selected by the learner.

The learning management system also may include an interface for exchanging information with the administration system. For example, the content player may update the learner account information as the learner progresses through the course material.

Course Navigation

The structure of a course is made up of a number of graphs of the structural elements included in the course. A navigation tree may be determined from the graphs by applying a selected learning strategy to the graphs. The navigation tree may be used to navigate a path through the course for the learner. Only parts of the navigation tree are displayed to the learner at the learning portal based on the position of the learner within the course.

As described above, learning strategies are applied to the static course structure including the structural elements (nodes), metadata (attributes), and relations (edges). This data is created when the course structure is determined (e.g., by a course author). Once the course structure is created, the course player processes the course structure using a strategy to present the material to the learner at the learning portal.

To process courses, the course player grants strategies access to the course data and the corresponding attributes.

The strategy is used to prepare a record of predicates, functions, operations, and orders that are used to calculate navigation suggestions, which is explained in further detail below.

The content player accesses files (e.g., XML files storing course graphs and associated media content) in the content repository and applies the learning strategies to the files to generate a path through the course. By applying the learning strategies the content player produces a set of course-related graphs (which is simply an ordered list of nodes) that are used to generate a navigation tree of nodes. The set of nodes may be sorted to generate an order list of nodes that may be used to present a path through the material for a learner. In general graphs and strategies may "interact" in the following ways:

1. A strategy implements a set of Boolean predicates that can be applied to graph nodes. For example: isCompleted (node).

2. A strategy may be informed by an event that some sort of action has been performed on a graph node. For example: navigated (node).

3. A strategy may provide functions that are used to compute new node sets for a given node. For example: NavigationNodes (node).

4. A strategy provides an ordering function that turns node sets computed number 3 into ordered lists.

5. A strategy may decide to alter certain strategy-related node attributes. For example: node.setVisited(true).

Note that the last point is used because a strategy does not keep any internal state. Instead, any strategy-related information is stored in graph nodes' attributes allowing strategies to be changed "on the fly" during graph traversal.

As described there are sets of nodes that may be used to generate a path through a course. One set of nodes are "navigation nodes." Navigation nodes may include all nodes that the strategy identifies that may be immediately reached from the current node. In other words, the navigation nodes represent potential direct successors from a current node. Another set of nodes are "start nodes." Start nodes are potential starting points when entering a new graph. The more starting points this set contains, the more choices a learner has when entering the unit. As a consequence, any strategy should implement at least two functions that can compute these sets and the ordering function that transforms those sets into ordered lists. The functions are described in further detail below using the following examples.

In the following examples, these definitions are used:

C is the set of all courses.

G is a set of graphs.

V is a set of vertices (e.g., knowledge items, references to learning units, references to sub courses, and test) Vertices are used when talking about graphs in a mathematical sense (whereas nodes may used to refer to the resulting course structure)

E is a set of edges (e.g., relations types as used in a mathematical sense).

TG={sc,lu} is the set of graph types such that:
sc=sub-course; and
lu=learning unit.

TC={sc,lu,co,tst} is the set of content types such that:
sc=sub-course;
lu=learning unit;
co=content; and
tst=test.

(With respect to assigning competences to a learner when passing a test, only pretests and posttests are defined as tests; self-tests and exercises are content rather than tests.)

TK={ . . . } is the set of all knowledge types (e.g., as described in the section E-learning content structure).

TR={ . . . } is the set of all relation types(e.g., as described in the section E-learning content structure).

BOOL={true,false} is the Boolean set with the values true and false.

MAC={ . . . } is the set of macro-strategies (e.g., as described in the section E-learning strategies).

MIC={ . . . } is the set of micro-strategies (e.g., as described in the section E-learning strategies).

COMP={ . . . } is the set of all competences.

LCOMP$\subseteq$COMP is the set of a learner's competences.

TST={pre,post} is the set of test types, such that:
pre=pretest; and
post=posttest.

A course $c=(G_c,g_s,mac,mic)\in C$ may be defined such that:

$G_c$ is the set of all sub-courses and learning units that are members of c;

$g_s$ is the start graph of course c, in particular $g_s, \in G$;

mac$\in$EMAC is the macro-strategy that has been chosen for navigating the course; and mic$\in$MIC is the micro-strategy that has been chosen for navigating the course.

Processing of the course begins with the start graph.

A graph $g=(V_g,E_g,t_g,comp_g)\in G$ may be defined such that:

$V_g$ is the set of all vertices in g;

$E_g\subseteq V_g \times V_g \times TR$ is the set of all edges in g;

$t_g\in TG$ is the graph type of g; and $comp_g\subseteq COMP$ is the competences of the graph.

In the following description the term content graph is used to identify the sub-graph to which a vertex refers, rather than a graph that includes the vertex. One can think of the vertex representing the "palceholder" of the sub-graph. A vertex $v=(vs_v,tc_{v,gcc},tk_v,tt_{v,mscore_v},ascore_v)\in V$ is defined such that:

$vs_v\in$BOOL is the visited status of v;

$tc_v\in$TC is the content type of v;

$gc_v\in$G is the content graph of v;

$tk_v\in$TK is the knowledge type of v;

$tt_v\in$TST is the test type of v;

$mscore_v$ is the maximum possible test score of v; and $ascore_v$ is the test score actually attained for v.

An edge or relation type $e=(v_S,v_E,tr_e)\in E$ may be defined such that:

$v_S\in V$ is the starting vertex of e;

$V_E\in V$ is the end vertex of e; and $tr_e\in TR$ is the relation type of e.

A predicate is a mapping p:V$\rightarrow$BOOL that assigns a value $b_p\in$BOOL to each vertex $v\in V$. Therefore:

$$b_p=p(v).$$

An order is a mapping ord:V$\times$V$\rightarrow$BOOL that assigns a value $b_{ord}\in$BOOL to a pair of vertices $v_1,v_2\in V$. Therefore:

$$b_{ord}=ord(v_1,v_2).$$

The mapping sort:$V^n$,ord$\rightarrow V^n$ is a sorting function from a set of vertices $V^n$ to a set of vertices $(v_1, \ldots ,v_n)=\overline{V}^n$ with the order ord, provided that:

$(v_1, \ldots, v_n) = \text{sort}(V^n, \text{ord})$ such that $$\forall_{i,j \in (1 \ldots n), i \neq j} v_i, v_j \in V^n : \text{ord}(v_i, v_j) = \text{true}$$

for $i \leq j$.

The following description explains the use of attributes. Attributes are used to define and implement the learning strategies.

Let $g = (V_g, E_g, t_g, \text{comp}_g) \in G$ be a graph with the following attributes:

g.nodes=$V_g$ is the vertices of g;
g.type=$t_g$ is the type of g; and
g.comp=$\text{comp}_g$ is the graph's competences.

Let $v = (vs_v, tc_v, gc_c, tk_v, tt_v, \text{mscore}_v, \text{ascore}_v) \in V$ be a vertex with the following attributes:

v.visited=$vs_v$ is the visited status of vertex v (initially this value is false);

v.graph=$\{g = (V_g, E_g, t_g) \in G | v \in V_g\}$ is the graph that contains v;

v.contentType=$tc_v$ is the content type of v;

$$v.contentGraph = \begin{cases} g' \in G : tc_v = sc \vee tc_v = lu \\ undef : \text{otherwise} \end{cases}$$

is the content graph of v;

v.knowType=$tk_v$ is the knowledge type of v;

$$v.testType = \begin{cases} tt_v \in TST : tc_v = tst \\ undef : \text{otherwise} \end{cases}$$

is the test type of v;

v.mscore=$\text{mscore}_v$ is the maximum possible test score of v (initially this value is 0);

v.ascore=$\text{ascore}_v$ is the actual test score attained for v (initially this value is $-1$ Let $e = (v_S, v_E, tr_e) \in E$ be an edge with the following attributes:

e.start=$v_S$ is the starting vertex of e;
e.end=$v_E$ is the end point of e;
e.type=$tr_e$ is the relation type of e;

An edge's logical direction does not necessarily have to agree with the direction indicated by the course player, because the course player displays an edge in the "read direction." This applies to the following edge, for example, $e = (v_S, v_E, \text{"is a subset of"})$. The following explanation refers to the logical direction, in other words, the direction of the edge in the above-described cases is considered to be "rotated." In the following, undirected edges are treated as two edges in opposite directions.

Predicates are "dynamic attributes" of vertices. The strategy computes the dynamic attributes for an individual vertex when necessary.

The following are examples of predicates:

Visited(v): the vertex v has already been visited;
Suggested(v): the vertex v is suggested;
CanNavigate(v): the vertex v can be navigated; and
Done(v): the vertex v is done.

If a vertex is within a learning unit (i.e., v.graph.type=lu), then the micro-strategy is used to compute the predicates.

The macro-strategy that is chosen is responsible for determining all other vertices.

Functions are used to compute the navigation sets (vertices that are displayed). A function should return a set of vertices. The strategies implement the functions.

For example, the following functions are:

$\overline{V}$=StartNodes(g)=$\{\overline{v} | \overline{v}$ is a starting vertex of g$\}$ is the set of all starting vertices of graph g. Starting vertices are the vertices of a graph from which navigation within the graph may be initiated in accordance with a chosen strategy.

$\overline{V}$=NextNodes(v)=$\{\overline{v} | \overline{v}$ is a successor of v$\}$ is the set of all successor vertices of vertex v.

For micro-strategies, the chosen macro-strategy calls the functions as needed. When entering a learning unit the macro-strategy selects the appropriate (selected) micro-strategy.

Operations provide information to the chosen strategy about particular events that occur during navigation of a course. The strategy may use them to change the attributes. The operations are:

navigate(v); The runtime environment calls this operation as soon as the vertex v is navigated during the navigation of the course.

testDone(v,MaxScore,ActScore); The runtime environment calls this operation if the vertex v is a test (v.contentType=tst) that has been done. MaxScore contains the maximum possible score, ActScore the score actually attained.

If a vertex is in a learning unit, which means that v.graph.type=lu, then the micro-strategy computes these operations. The macro-strategy is responsible for all other vertices.

The runtime environment uses the sorting function to order the navigation sets that have been computed. The order determines the sequence in which the vertices are to be drawn. The "most important" vertex (e.g., from the strategy's point of view) is placed at the start of the list (as the next vertex suggested). The strategies implement these sorting functions and the runtime environment provides them. The following examples of sorting functions may be defined:

sortNav(V) is used to sort the set of navigation vertices.

The sorting functions are called automatically as soon as the functions have returned sets of vertices to the strategy in question. It is consequently necessary that each macro and micro-strategy have a sorting function at its disposal.

The following description explains the predicates, operations, functions, and sorting functions associated with macro-strategies.

The following is an example of how a top-down (deductive) learning strategy may be realized.

The predicates for the top-down strategy may be defined as follows:

Visited (v): v.visited

The vertex's "visited" attribute is set.

Suggested(v):$\forall (\overline{v}, v, tr) \in E$ such that tr=prerequisite we have:

Done($\overline{v}$)=true

All of the vertex's prerequisites are satisfied.

CanNavigate(v): Suggested (v)

Is used in this example like Suggested.

Done(v):

(v.contentType∈{*sc,lu*}∧v.contentGraph.comp≠∅⊆LCOMP)∨
 (v.contentType≠*tst*∧v.visited=true∧(∀
 v̄∈StartNodes(v.contentGraph):Done(v̄)=true))∨ (*c*.content-
 Type=*tst*∧(v.ascore*2)≥v.mscore)

The vertex v is considered done if at least one of the following conditions holds:
- It includes a learning unit or sub-course that has at its disposal a nonempty set of competences that the learner already possesses;
- It does not contain a test, is visited, and all of the content graph's starting vertices have been done; and/or
- It deals with a test and at least half of the maximum score has been attained.

The functions for the top-down strategy may be defined as follows:

$$StartNodes(g) = \begin{cases} g = undef:\emptyset \\ g.type = lu:c.mic.StartNodes(g) \\ g.type = sc:\{v \in V_g \mid \forall (v^*, v, tr) \in E:tr \neq hierarchical\} \end{cases}$$

If g is undefined, which means that vertex does not have any content graphs, then the set is empty.
If g is a learning unit, the StartNodes( ) function of the chosen micro-strategy will be used.
If g is a sub-course, all vertices that do not have any hierarchical relations referring to them will be returned.

NextNodes(v)={v̄∈$V_{v.graph}$|∃(v,v̄,tr)}∪StartNodes(v.contentGraph)

All vertices connected to v by an externally directed relation, plus all vertices that are starting vertices of the content graph of v.

The operations for top-down may be defined as follows:

navigate(v):v.visited=true

The vertex's "visited" attribute is set to true.

testDone(v,MaxScore,ActScore):v.mscore=MaxScore,v.ascore=ActScore if $$\begin{cases} Done(v) = true:LCOMP = LCOMP \cup v.graph.comp, \\ \forall \bar{v} \in v.graph:\bar{v}.visited = true \\ Done(v) = false:\forall \bar{v} \in v.graph:\bar{v}.visited = false \end{cases}$$

The maximum test score and the test score actually attained for the vertex are both set.
If the test is passed, the learner competences will be enlarged to include the competences of the graph, and all of the graph's vertices will be set to "visited."
If the test is not passed, all of the graph's vertices are reset to "not visited."

The sorting functionsortNav(V) may be defined upon an order relation <:$V_1 \times V_2$→bool on a set of vertices. This requires that the following auxiliary functions be defined:

1. An order relation for vertices with respect to the vertex ID $<_{id}$:$V \times V$→bool $v_1 <_{id} v_2 :\Leftrightarrow v_1.id < v_2.id$ 2. A comparison relation for vertices with respect to the vertex ID $=$:$V \times V$→bool, $v_1 = v_2 :\Leftrightarrow v_1.id = v_2.id$ 3. An order relation on the test types and unit types $<_{test}$:$(TC \times TST) \times (TC \times TST)$→bool $(tst,pre) < (co,undef) < (lu,undef) < (tst,post)$ 4. An order relation based on 3, for vertices with respect to the test types and unit types.

$<_{test}$:$V \times V$→bool $v_1 <_{test} v_2 :\Leftrightarrow (v_1.contentType, v_1.testType) <_{test} (v_2.contentType, v_2.testType)$ 5. A comparison relation for vertices with respect to the test types and unit types $=_{test}$:$V \times V$→bool $v_1 =_{test} v_2 :\Leftrightarrow (v_1.contentType, v_1.testType) = (v_2.contentType, v_2.testType)$ 6. An order relation on the knowledge types based on one of the micro-strategies (see micro-strategies)

$<_{micro}$:$TK \times TK$→bool

7. An order relation based on 6, on the vertices with respect to the micro-strategies.

$<_{micro}$:$V \times V$→bool $v_1 <_{micro} v_2 :\Leftrightarrow v_1.knowType <_{micro} v_2.knowType$ 8. A comparison relation to the vertices in regard to the knowledge types $=_{micro}$:$V \times V$→bool $v_1 =_{micro} v_2 :\Leftrightarrow v_1.knowType = v_2.knowType$ Using these definitions the function <:$V_1 \times V_2$→bool may be defined as follows:

$$v_1 < v_2 :\Leftrightarrow \begin{cases} \begin{aligned} & v_1.contentType \neq tst \land \\ & \exists v \in V_1 : [(v_1, v, prereq) \in E_1 \land v.contentType \neq tst \land v_1 < v \land v \leq v_2] \\ & \lor v_1 <_{test} v_2 \\ & \lor v_1 =_{test} v_2 \land v_1 <_{id} v_2 \end{aligned} & \text{if} & g_1 = g_2, t_1 \neq lu \\ \begin{aligned} & v_1.contentType \neq tst \land \\ & \exists v \in V_1 : [(v_1, v, prereq) \in E_1 \land v.contentType \neq tst \land v_1 < v \land v \leq v_2] \\ & \lor v_1 <_{test} v_2 \\ & \lor v_1 =_{test} v_2 \land v_1 <_{micro} v_2 \\ & \lor v_1 =_{test} v_2 \land v_1 =_{micro} v_2 \land v_1 <_{id} v_2 \end{aligned} & \text{if} & g_1 = g_2, t_1 = lu \\ \exists v = (vs, t_1, g_1, tk, tt, ms, as) \in V_2 : (v, v_2, tr) \in E_2 \land tr \in \{prereq, hierarchical\} & \text{if} & g_1 \neq g_2, t_1 = lu, t_2 \neq lu \\ \text{false} & \text{otherwise} \end{cases}$$

Figure 8:
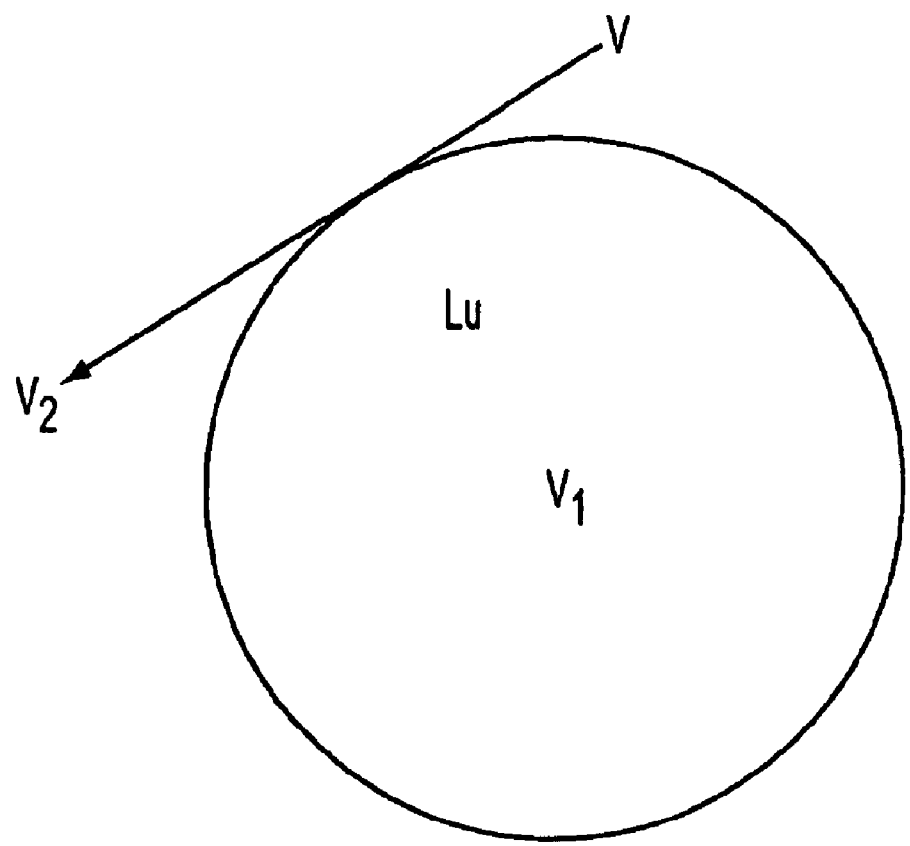
FIG. 8 is an example showing v as the vertex that represents the learning unit LU where $v_1, v_2$ are the vertices.

Note, if $g_1=g_2$, then it is obvious that $V_1=V_2, E_1=E_2, t_1=t_2$ and $comp_1=comp_2$. In addition, in case 3, a situation is maintained in which no direct relation between the vertices exists, but there does exist a relation to the higher-order vertex. The order relation will then also apply to all of the vertices in this vertex's content graph. This situation is depicted in FIG. 8, where v is the vertex that represents the learning unit and $v_1, v_2$ are the vertices under consideration.

The function sortNav(V) is the sort of the set V in accordance with the order relation <.

The following process is one method of implementing the function sortNav(V):

1. $V_{preTest} = \{v \in V | v.contentType=tst \land v.testType=pre\}$: the set of all pretests.
2. $V=V-V_{preTest}$: remove all pretests from V.
3. $V_{postTest} = \{v \in V | v.contentType=tst \land v.testType=post\}$: the set of all posttests.
4. $V=V-V_{postTest}$: remove all posttests from V.
5. $V_{preReq} = \{v \in V | \exists (\bar{v}, v, tr) \in E : tr=prerequisite\}$: the set of all vertices that have a prerequisite relation directed toward them.
6. $V=V-V_{preReq}$: remove all vertices in $V_{preReq}$ from V.
7. $L=V_{preTest}$: add all pretests into the sorted list.
8. $L=L \cup \{v \in V | v.contentType=co\}, V=V-L$: enlarge the sorted list to include all vertices that have a learning unit and then remove these vertices from V.
9. $L=L \cup \{v \in V | v.contentType=lu\}, V=V-L$: enlarge the sorted list to include all vertices that contain a learning unit and then remove these vertices from V.
10. $L=L \cup V$: enlarge the sorted list to include the remaining vertices from V.
11. Search for all vertices in $v \in V_{preReq}$: the vertex $v^* \in L$ such that $(v^*, v, prerequisite) \in E \land dist(v^*) = MAX$ (the vertex that is located farthest back in L and that possesses a prerequisite relation to v). Add v into L behind $v^*$.
12. $L=L \cup V_{postTest}$: enlarge the sorted list to include all posttests.
13. Return the sorted list L as the result.

The subsets determined in steps 7–12 are themselves sorted by the order relation $<_{id}$.

The following is an example of how a bottom-up (Inductive) learning strategy may be implemented.

The predicates for this strategy may be the same as those used for the macro-strategy, top-down. The functions for bottom-up may be defined as follows:

$$StartNodes(g) = \begin{cases} g = undef : \emptyset \\ g.type = lu : c.mic.StartNodes(g) \\ g.type = sc : \{v \in V_g \mid \forall (v^*, v, tr) \in E : tr \neq hierarchical\} \end{cases}$$

If g is undefined, the vertex doesn't have a content graph and the set is empty.

If g is a learning unit, then the StartNodes( ) function of the chosen micro-strategy will be used.

If g is a sub-course, then all vertices that do not have any hierarchical relations referring to them will be returned.

$$NextNodes(v) = \{\bar{v} \in V_{v.graph} \mid \exists (\bar{v}, v, tr)\} \cup$$

$$\begin{cases} v.contentType = le \land \exists (v, v^*, tr) \in E : tr = \\ hierarchic \land Done(v^*) = false: \\ OrientationOnly.StartNodes(v.contentGraph) \\ else: \\ StartNodes(v.contentGraph) \end{cases}$$

All vertices that are connected to v by an externally directed relation.

If the vertex contains a learning unit and one of the hierarchically subordinate vertices has not yet been visited, enlarge the set to include the learning unit's starting vertex using the micro-strategy "orientation only." Otherwise, enlarge the set to include all vertices that are starting vertices of the content graph of v.

The operations and sorting function for the bottom-up strategy are the similar to the macro-strategy top-down and therefore are not repeated.

Linear macro-strategies represent a special case of the macro-strategies that have already been described. In linear macro-strategies, the elements of the sorted sets of vertices are offered for navigation sequentially, rather than simultaneously. This linearization may be applied to any combination of macro and micro-strategies.

The following description includes examples of how a micro-strategy may be realized. In this example, an orientation only micro-strategy is described.

The predicates for the micro-strategies may be defined as follows:

Visited(v):v.visited

The vertex's "visited" attribute is set.

Suggested(v):∀(v̄,v,tr)∈E such that tr=prerequisite we have:

Done(v̄) true

All of the vertex's prerequisites are already satisfied.

CanNavigate(v):Suggested(v)

This may be used like Suggested.

Done(v):(v.contentType≠tst∧v.visited=true)v(c.contentType=tst∧(v.ascore*2)≧v.mscore)

The vertex v is considered done if:
It does not contain a test and has already been visited.
It deals with a test and at least half of the maximum score has been attained.
The functions may be defined as follows:

StartNodes(g)={v∈$V_g$|v.knowType=Orientation}∪{v∈$V_g$|∃(v,v̄,tr)∈E:tr=prereq∧v.knowType=Orientation}

The set of all vertices with knowledge type orientation, plus all vertices that have a prerequisite relation to a vertex with knowledge type orientation.

NextNodes(v)=∅

For this micro-strategy, this is always the empty set. In other words, no successor vertices exist because all relevant vertices are contained in the set of starting vertices.
The operations may be defined as follows:

navigate(v):v.visited=true

The vertex's "visited" attribute is set to true.

testDone(v,MaxScore,ActScore):v.mscore=MaxScore,v.ascore=ActScore if $$\begin{cases} Dove(v) = true: LCOMP = LCOMP \cup v.graph.comp, \\ \forall \bar{v} \in v.graph:\bar{v}.visited = true \\ Dove(v) = false: \forall \bar{v} \in v.graph:\bar{v}.visited = false \end{cases}$$

The maximum test score and the test score actually attained for the vertex are both set.

If the test is passed, the learner competences will be enlarged to include the competences of the graph, and all of the graph's vertices will be set to "visited."

If the test is not passed, all of the graph's vertices are reset to "not visited."

The micro-strategy orientation only may use a sorting function that is similar to sorting function for the macro-strategy top-down and, therefore is not repeated.

The following is an example of the implementation of an example oriented micro-strategy. The predicates for this strategy are identical to those for the micro-strategy orientation only and are not repeated.
The functions may be defined as follows:

StartNodes(g)=$V_g$

All vertices that are contained in the learning unit.

NextNodes(v)=∅

For this micro-strategy, this is always the empty set. In other words, no successor vertices exist because all relevant vertices are contained in the set of starting vertices.

The operations for the example-oriented micro-strategy are identical to those for the micro-strategy "orientation only," and, therefore, are not repeated.

The sorting function for example-oriented is defined as follows:

$$v_1 < v_2 :\Leftrightarrow \begin{cases} v_1 <_{test} v_2 \lor \\ v_1 =_{test} v_2 \land v_1 <_{id} v_2 & \text{if} & v_2.contentType = tst \\ \not\exists (v_1, v_2, tr) \in :tr = preq \lor \\ (v_1.knowType = & \text{if} & v_2.knowType = \\ Example \land v_1 <_{id} v_2) & & Example \\ v_1.knowType = Example \lor \\ v_1 <_{id} v_2 & & \text{otherwise} \end{cases}$$

Steps for executing sortNav(V):
1. $V_{examp}$={v∈V|v.knowType=Example}∪ {v∈V|∃(v,v̄,tr)∈E:tr=prereq∧v̄.knowType=Example}: the set of all vertices that contain examples, plus the prerequisites of these vertices.
2. $V_{remain}$=V−$_{examp}$: the remaining vertices from V.
3. $L_{examp}$=TopDown.sortNav($V_{examp}$): sort the set of examples using the sorting algorithm from the top-down strategy.
4. $L_{remain}$=TopDown.sortNav($V_{remain}$): sort the set of remaining vertices using the sorting algorithm from the top-down strategy.
5. L=$L_{examp}$∪$L_{remain}$: form the union of the two sorted lists.
6. Return the sorted list L as the result.

The predicates, functions, and operations for the micro-strategy explanation-oriented are identical to those for the micro-strategy example-oriented, and, therefore are not repeated. The sorting function for the explanation-oriented micro-strategy is similar to the sorting function of the micro-strategy example-oriented (the only difference being that explanations, rather than examples, are used to form the two sets).

The predicates, functions, and operations for the micro-strategy action-oriented are identical to those for the micro-strategy example-oriented, and, therefore are not repeated. The sorting function for the action-oriented micro-strategy is similar to the sorting function of the micro-strategy example-oriented (the only difference being that actions, rather than examples, are used to form the two sets).

A number of implementations have been described. Nevertheless, it will be understood that various modifications may be made. For example, advantageous results may be achieved if the steps of the disclosed techniques are performed in a different order and/or if components in a disclosed system, architecture, device, or circuit are combined in a different manner and/or replaced or supplemented by other components. Accordingly, other implementations are within the scope of the following claims.

What is claimed is:

1. A method, performed by one or more processing devices, for navigating through a course, the method comprising:
receiving, via a processing device, one or more graphs corresponding to the course, the one or more graphs comprising nodes, at least one of the nodes storing attribute relating to a learning strategy for navigating through the course;
applying, via a processing device, the learning strategy to the one or ore graphs, wherein applying the learning strategy comprises altering the attribute relating to the learning strategy; and generating, via a processing device, a navigation tree for the course ed on the applied learning strategy.

2. The method of claim 1 further comprising generating, via a processing device, a navigation path to suggest content from the course for presentation to a learner.

3. The method of claim 1 wherein each nod corresponds to a course, a sub-course, a learning unit, or a knowledge item.

4. The method of claim 1 wherein the one or more nodes include an attribute corresponding to metadata.

5. The method of claim 4 wherein the metadata includes knowledge type.

6. The method of claim 1 wherein at least one graph includes at least two nodes and a relation between the at least two nodes.

7. The method of claim 1 wherein applying a learning strategy includes applying a set of Boolean predicates to the one or more graphs.

8. The method of claim 1 wherein applying the learning strategy includes applying one or more functions to the one or more nodes to generate one or more sets, and generating the navigation tree includes applying an ordering function to the one or more sets to generate an ordered list, where the navigation tree is based on the ordered list.

9. The method of claim 8 wherein applying one or more functions to generate one or more sets includes determining a set of navigation nodes that indicate nodes identified by the learning strategy that may be presented to a learner.

10. The method of claim 8 wherein applying one or more functions to generate the one or more sets includes determining a set of start nodes that indicate a first node within a graph that may be visited by a learner.

11. The method of claim 1 wherein applying the learning strategy includes determining that an event has been performed on a node.

12. The method of claim 1 wherein applying the learning strategy includes applying a macro-strategy.

13. The method of claim 12 wherein applying the macro strategy includes applying one of a goal-based, top-down strategy, a goal-based, bottom-up strategy or a table of contents strategy.

14. The method of claim 1 wherein applying the learning strategy includes applying a micro-strategy.

15. The method of claim 14 wherein applying the micro-strategy includes applying one of an orientation only strategy, an action oriented strategy, an explanation oriented strategy, an orientation oriented strategy, or a table of contents strategy.

16. A learning management system configured to provide navigation for a course comprising:

an input to receive one or more graphs corresponding to the course, the one or more graphs comprising nodes, at least one of the nodes storing an attribute relating to a learning strategy for navigating through the course;

an output to provide a navigation path through the course; and a processor to apply the learning strategy to the one or more graphs to generate the navigation path, wherein applying the learning strategy comprises altering the attribute relating to the learning strategy.

17. The system of claim 16 wherein the navigation path suggests content from the course for presentation to a learner.

18. The system of claim 16 wherein each node corresponds to one of a course, a sub-course, a learning unit, and a knowledge item.

19. The system of claim 19 wherein the one or more nodes include attributes corresponding to metadata.

20. The system of claim 19 wherein the metadata includes knowledge type data.

21. The system of claim 16 wherein at least one graph includes at least two nodes and a relation corresponding to the at least two nodes.

22. The system of claim 16 wherein the processor is configured to apply a set of Boolean predicates to the one or more graphs.

23. The system of claim 16 wherein the processor is configured to apply one or more functions to the one or more nodes to generate one or more sets, and to generate the navigation path by applying an ordering function to the one or more sets to generate an ordered list, where the navigation path is based on the ordered list.

24. The system of claim 23 wherein processor is configured to determine a set of navigation nodes identified by the learning strategy that may be presented to a learner.

25. The system of claim 23 wherein the processor is configured to determine a set of start nodes that indicate a first node within a graph that may be visited by a learner.

26. The system of claim 16 wherein applying the learning strategy includes determining that an event has been performed on a node.

27. The system of claim 16 wherein applying the learning strategy includes applying a macro-strategy.

28. The system of claim 27 wherein applying the macro-strategy includes applying one of a goal-based, top-down strategy, a goal-based, bottom-up strategy or a table of contents strategy.

29. The system of claim 16 wherein applying the learning strategy includes applying a micro-strategy.

30. The system of claim 29 wherein applying the micro-strategy includes applying one of an orientation only strategy, an action oriented strategy, an explanation oriented strategy, an orientation oriented strategy, or a table of contents strategy.

31. A machine-readable medium including instructions to cause a processor to:

receive one or more graphs corresponding to the course, the one or more graphs comprising nodes, at least one of the nodes storing an attribute relating to a learning strategy for navigating through the course;

apply the learning strategy to the one or more graphs, wherein applying the learning strategy comprises altering the attribute relating to the learning strategy; and generate a navigation path through the course for a learner based on the applied learning strategy.

32. The machine-readable medium of claim 31 wherein instructions to cause a processor to generate the navigation path cause a processor to suggest content from the course for presentation to a learner.

33. The machine-readable medium of claim 31 wherein the instructions to cause a processor to apply one or more graphs cause a processor to apply the learning strategy to one or more nodes.

34. The machine-readable medium of claim 33 wherein the instructions to cause a processor to apply the learning strategy to one or more nodes cause a processor to apply the learning strategy to one or more node corresponding to one of a course, a sub-course, a learning unit, and a knowledge item.

35. The machine-readable medium of claim 33 wherein the instructions to cause a processor to apply the learning strategy to the one or more nodes cause a processor to use an attribute corresponding to metadata of the one or more nodes.

36. The machine-readable medium of claim 35 wherein the instructions to cause a processor to use the attribute cause a processor to use a knowledge type.

37. The machine-readable medium of claim 31 wherein the instructions to cause a processor to apply a learning strategy cause the processor to apply a set of Boolean predicates to the one or more graphs.

38. The machine-readable medium of claim 33 wherein the instructions to cause a processor to apply the learning strategy cause the processor to apply one or more functions to the one or more nodes to generate one or mores sets and to generate the navigation path, cause the processor to apply an ordering function to the one or more sets to generate an ordered list, where the navigation path is based on the ordered list.

39. The machine-readable medium of claim 38 wherein the instructions to cause a processor to apply one or more functions to generate one or more sets cause the processor to determine a set of navigation nodes that indicate nodes identified by the learning strategy that may be presented to the learner.

40. The machine-readable medium of claim 38 wherein the instructions to cause a processor to apply one or more functions to generate the one or more sets cause the processor to determine a set of start nodes that indicate a first node within a graph that may be visited by the learner.

41. The machine-readable medium of claim 33 wherein the instructions to cause a processor to apply the learning strategy cause the processor to determine that an event has been performed on a node.

42. The machine-readable medium of claim 31 wherein the instructions to cause a processor to apply the learning strategy cause the processor to apply a macro-strategy.

43. The machine-readable medium of claim 42 wherein the instructions to cause a processor to apply the macro-strategy cause the processor to apply one of a goal-based, top-down strategy, a goal-based, bottom-up strategy, or a table of contents strategy.

44. The machine-readable medium of claim 31 wherein the instructions to cause a processor to apply the learning strategy cause the processor to apply a micro-strategy.

45. The machine-readable medium of claim 31 wherein the instructions to cause a processor to apply the micro-strategy cause the processor to apply one of an orientation only strategy, an action oriented strategy, an explanation oriented strategy, an orientation oriented strategy, or a table of contents strategy.

* * * * *